United States Patent Office 3,606,816
Patented Sept. 21, 1971

3,606,816
AUTOMATIC STEP FEED DEVICE FOR
DUPLICATING MILLING MACHINES
Albert Blottcher, Scharzfeld, Harz, and Hans Maass, Bad Lauterberg, Harz, Germany, assignors to Franz Kuhlmann KG, Prazisionsmechanik und Maschinenbau, Wilhelmshaven, Germany
Filed July 22, 1969, Ser. No. 843,327
Claims priority, application Germany, July 22, 1968,
P 17 52 827.7
Int. Cl. B23c 1/16
U.S. Cl. 90—13.1
6 Claims

ABSTRACT OF THE DISCLOSURE

A step feed device for duplicating milling machines equipped with a pantograph operated by an adjustable stop which is provided with a spindle screwed into a threaded sleeve and arranged for displacement in a casing. The sleeve is biased by a spring at one end thereof and during displacement of the sleeve in the casing a rotary control device engages the sleeve so that it can turn in only a single direction with respect to the spindle. To obtain a step feed, the pantograph need only be lifted so that the threaded sleeve can be shifted by the spring and then lowered again to thereby change the working plane or level of the pantograph.

Figure 1:
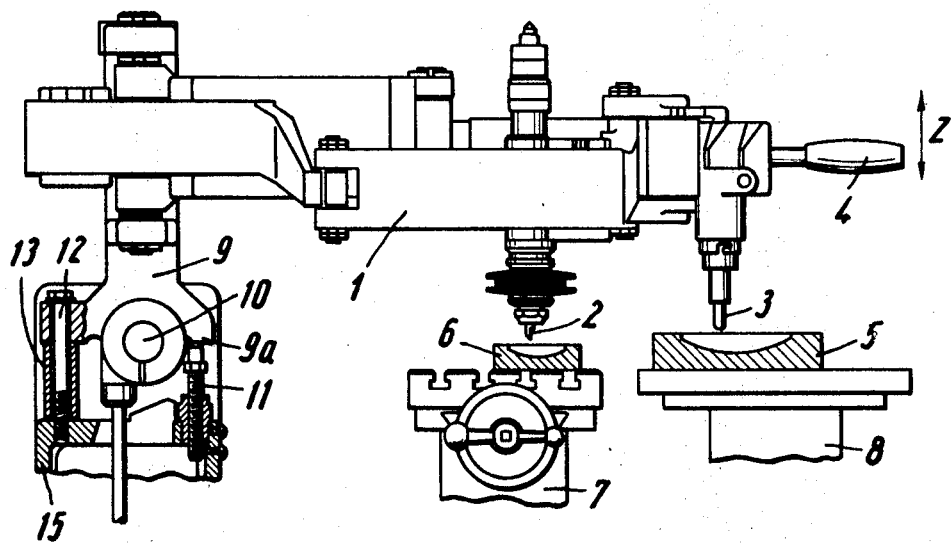

This invention relates to an automatic step feed device for duplicating milling machines equipped with a pantograph operated by an adjustable stop by means of a supporting cam.

In a known duplicating milling machine, the step feed is carried out manually in such a manner that an adjusting screw, which is also the stop screw, is turned each time by a given amount. The tool guided by the pantograph is thus advanced by this amount in the direction of the Z-axis against the workpiece. The adjustment along the two other axes of machining, X and Y, may be performed step by step during the machining operation by means of a line engraving device which is to be placed on the pattern table. The pantograph is normally provided with the stop because in the case of deep cutting depths in the Z-axis, the milling cutter exhibits the tendency to sink into the material which leads to breakage of the tool. The manual step feed procedure thus interrupts the operation considerably, preventing it from being carried out in a uniform manner, that is, the individual manually adjusted steps are not of identical magnitude.

Accordingly, the purpose of the invention is to produce a step feed device for duplicating milling machines of the type explained above, which permits an automatic and uniform step feed with negligible interruption of operation.

According to the principles of this invention, the desired purpose is attained such that the stop is provided with a spindle screwed into a threaded sleeve arranged for conditioned displacement in a casing attached to the machine. In the working position of the pantograph, the sleeve rests against a stop and against an action of a spring on the casing. During a displacement in the casing, the sleeve cooperates with a rotary device in such a manner that on displacement it can be turned only in a single direction in relation to the spindle. In order to obtain a step feed the pantograph need only be lifted so that the threaded sleeve can be shifted by the spring and then lowered again, the rotary device, in effect, turning the threaded sleeve in relation to the spindle so that the latter is raised or lowered depending on the direction of rotation, and the working plane (level) of the pantograph is changed. In contrast with a manual feed, the present invention allows that a working position need no longer be left for carrying out the adjustment, thus saving time and labor. Moreover, the automatic step feed requires substantially shorter time than the manual setting of the supporting screw, which itself cannot be performed with uniformity.

The threaded sleeve is preferably in friction contact with a friction ring guided by means of a slide and is displaceable, but not turnable, in relation to a pinion situated in the casing coaxially to the threaded sleeve and engaging a spring-loaded arresting device which permits rotation of the pinion only in a single direction to be selected. Depending on the setting of the arresting device, which acts as a ratchet, the threaded sleeve is turned by the friction ring which is turned when the threaded sleeve is displaced so that a different relative position of spindle and threaded sleeve is obtained.

In accordance with a further development of this invention, the device securing the pinion and threaded sleeve against relative rotation may consist of a pin attached to the pinion engaging a longitudinal slot in the threaded sleeve and will serve simultaneously as a fixed stop for limiting the longitudinal movement of the threaded sleeve under the effect of a spring bias. In a simple manner the element securing the pinion and threaded sleeve against relative rotation is also employed as a stop for longitudinal displacement of the threaded sleeve so that additional structural components are not required.

In accordance with a further development of this invention, the pantograph-loaded stop of the threaded sleeve may consist of a ring surrounding the sleeve, adjustable in relation thereto preferably by means of a screw thread, and provided with a measuring scale for the adjustment of feed distance. On the one hand, such a stop, which bears the load of the pantograph and rests on the casing attached to the machine, limits the displacement of the threaded sleeve and thus the relative displacement between spindle and threaded sleeve while, on the other hand, it provides the possibility of increasing or reducing the step feed since it can be adjusted in relation to the threaded sleeve. Because such a ring is not reset during an ordinary operation, the step feed remains completely uniform.

In order to avoid slipping of the ring in friction contact with the threaded sleeve in the direction of rotation where the pinion is not blocked, the pinion rests between two thrust bearings, preferably roller bearings, which facilitates turning of the pinion as well as the threaded sleeve coupled thereto.

Figure 2:
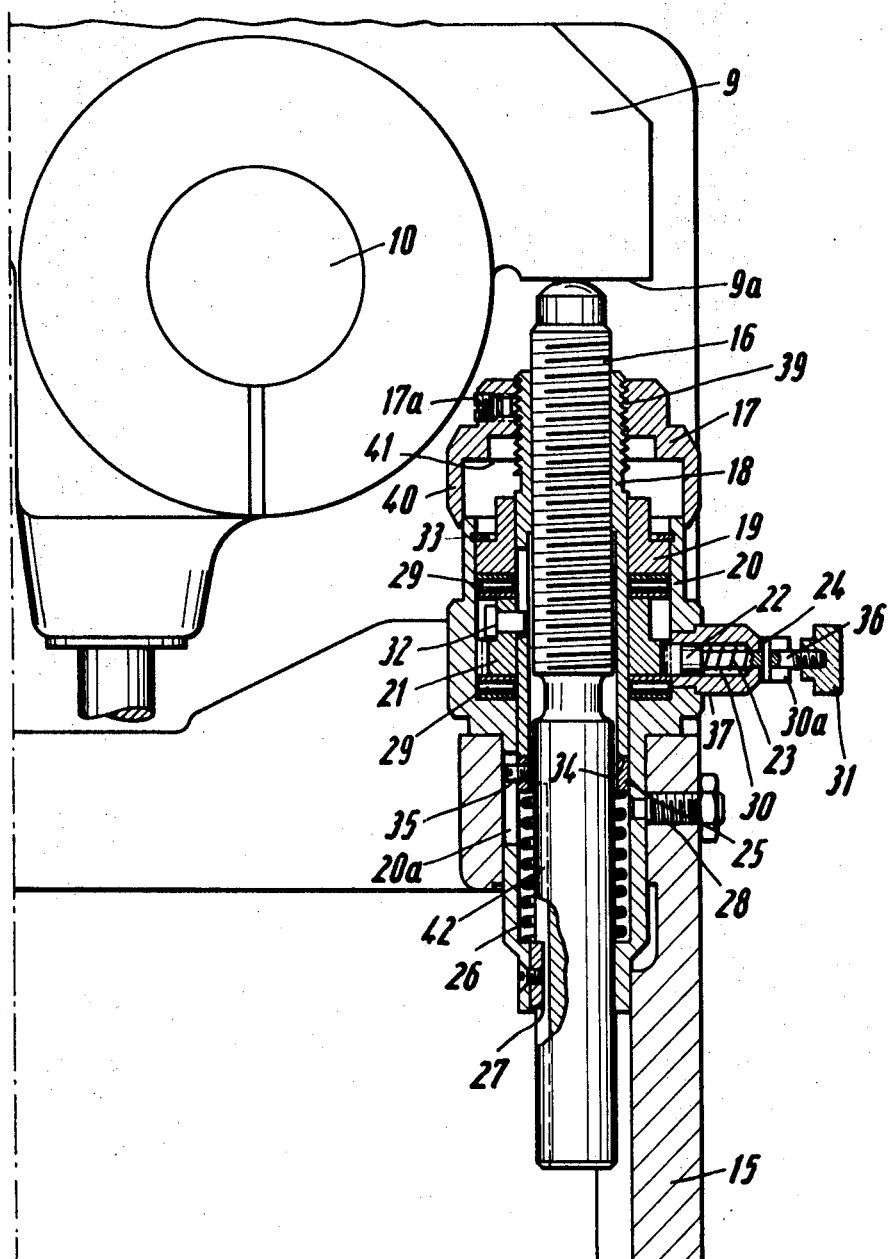

Further objects and advantages will become more apparent from a reading of the following detailed specification taken in conjunction with the drawings, in which:

FIG. 1 shows a partial elevation of a duplicating milling machine with a pantograph supported according to the prior art; and FIG. 2 is a longitudinal section through the step feed device of the invention.

As seen in FIG. 1, a main support 9 for a pantograph 1 is provided on a stand 15 of a duplicating milling machine. Pantograph 1 is pivotable about a pivot 10 for displacing the tool in Z-direction. A work table 7 and a pattern table 8 are also provided on stand 15. Numerals 5 and 6 designate, respectively, a pattern and a workpiece, fixed on the machine after preliminary alignment. Photograph 1 carries a milling spindle 2 and a feeler 3. An operating lever 4 is employed for actuating the pantograph. In a known embodiment, the step feed of the pantograph is performed by means of a step feed screw 11 abutting against a cam 9a of main support 9. The latter is fixed on stand 15 by means of a screw 12 and a spacer 13 so that the pantograph is fixed in position. In the case of step milling, main support 9 is released by removing the screw 12 and spacer 13.

When the milling operation is performed with the step feed device of the present invention, step feed screw 11 is turned to the end so that pantograph 1 is freely movable in its vertical plane. The step feed function is transferred to the device of the invention which is attached to stand 15 beside step feed screw 11 by means of a screw 28.

As seen in FIG. 2, a threaded sleeve 18 and a spindle 16 are arranged in a casing 20 attached to the machine. Spindle 16 abuts against cam surface 9a and maintains the pantograph at the desired level. Casing 20, which is closed by a cover 19, contains a pinion 21 supported between two thrust roller bearings 29 coaxially with threaded sleeve 18 and attached thereto by means of a pin 32 which engages a slot 33 of sleeve 18 so that pinion 21 and sleeve 18 are secured against relative rotation. The slot 33, however, permits axial displacement of sleeve 18 with respect to pinion 21. A spring 26 resting at the bottom of the casing presses against a friction ring 25 mounted on spindle 16 against the lower end of sleeve 18. The lower portions of spindle 16 and sleeve 18 are not provided with threads. Friction ring 25 is provided with an extension 35 which engages a slide groove 20a having a steep or low pitch thread so that the ring rotates with its axial displacement. An arresting device 30 inserted in casing 20 is equipped with an arresting member 22 loaded by a spring 23 and engaging the gaps between the teeth of pinion 21 such as to block pinion 21 only in a single direction of rotation. Arresting member 22 has a cylindrical projection 36 extending from a casing 37 of the arresting device 30 and provided with an operating knob 31. A pin 24, inserted perpendicularly to projection 36 into a bore, rests on the bottom of a slot 30a of casing 37. If operating knob 31 is turned after pin 24 is removed from slot 30a, arresting member 22 may be turned 180° so that the blocked direction is released and the opposite direction of rotation is blocked.

A ring 17 is provided at the upper end of sleeve 18 and is adjustable in relation thereto by means of thread 39; a set screw 17a serves to fix the ring on the sleeve. Ring 17 is provided with a collar or flange 40 which surrounds casing 20 and abuts with a section 41 against the upper edge of casing 20 in the lower position of sleeve 18, thus limiting the displacement of threaded sleeve 18 brought about by the weight of pantograph against the action of spring 26.

Spindle 16 abutting with a convex end against cam surface 9a is provided with thread only in the upper portion while the lower portion is smooth and possesses a longitudinal groove 42 engaged by a wedge member 27 fixed on casing 20 and securing spindle 16 against rotation.

The automatic step feed device operates in the following manner: After a milling operation is completed, pantograph 1 is lifted by means of hand lever 4 so that load is removed from spindle 16 and threaded sleeve 18 connected thereto, both of which are then pushed upward by spring 26. Through the upward movement, friction ring 25 is turned by means of extension 35 engaging slide groove 20a. Since pinion 21 is held by arresting member 22, friction ring 25 slides on a frontal surface 34 of threaded sleeve 18. Thus, the latter is shifted upward only in an axial direction, the upward movement being limited by pin 32 engaging slot 33. If pantograph is dropped again, spindle 16 presses threaded sleeve 18 downward against the bias of spring 26, and friction ring 25 turned by slide groove 20a is then able to turn sleeve 18 since pinion 21 is not blocked in this direction of rotation by arresting member 22. Because of the thread connection between threaded sleeve 18 and spindle 16, the first is displaced axially in relation to the latter as the first is turned by means of friction ring 25, since spindle 16 is secured against rotation by means of wedge 27. The mutual axial displacement of the two elements 16 and 18 takes place until ring 17 with its portion 41 abuts against the upper portion of casing 20. Since spindle 16 is displaced in relation to threaded sleeve 18 after the downward movement is completed, the pantograph 1 assumes a different position. Since ring 17 can be adjusted in relation to threaded sleeve 18 by means of thread 39, the length of free displacement of threaded sleeve 18 and the magnitude of feed may be modified. A measuring scale may be provided on ring 17 for an exact adjustment of feed magnitude. If the ring is not reset during the machining of a workpiece, the particular feed magnitude remains contstant which could not be attained with such accuracy by means of conventional feed screws.

The occurrence of feed during the upward or downward movement of threaded sleeve 18 depends on the concave or convex shape of the workpiece to be machined. Accordingly, arresting member 22 is so adjusted that pinion 21 can rotate freely in the proper direction of rotation.

Since the dimensions of casing 20 containing spindle 16 and threaded sleeve 18 are relatively small and the casing can be readily attached to a machine stand, the device of the invention can be mounted at any time as a supplemental unit on existing duplicating milling machines.

That which is claimed is:

1. In an automatic step feeding device for a duplicating milling machine comprising a pantograph pivotally connected to the frame of said machine, and said pantograph having an abutment thereon to engage an adjustable stop secured to said frame to permit the pantograph to feed depthwise relative to a workpiece, said adjustable stop including a spindle having one end engageable with said pantograph abutment and another portion of said spindle being threadingly received in a sleeve, said sleeve being rotatably and axially displaceably mounted within a casing secured to said frame, means in said casing biasing said sleeve and thereby said spindle toward said abutment, means restricting said spindle to movement only in the axial direction; and rotary control means acting on said sleeve during axial displacement thereof in said casing for automatically rotating said sleeve in a single direction causing said spindle to move axially relative to said sleeve thereby permitting said pantograph to feed in a depthwise direction.

2. A device according to claim 1, wherein said rotary control means comprises a friction ring frictionally engaging one end of said sleeve, said ring being guided in a helical slot means in said casing, and a pinion member positioned in said casing coaxially with said sleeve, said pinion cooperating with a spring-loaded arresting means for allowing said pinion to turn solely in one preselected direction of two opposite rotational directions.

3. A device according to claim 2, wherein a means is provided for securing said pinion and said sleeve against relative rotation, said means limiting the longitudinal displacement of said sleeve.

4. A device according to claim 3, wherein said means comprises a pin member secured to said pinion for engaging a longitudinal slot on said sleeve.

5. A device according to claim 1, wherein said sleeve comprises a ring member surrounding said sleeve and having thread means for adjustably positioning said ring with respect to said sleeve, said ring being provided with a measuring scale for adjustment of feed distance.

6. A device according to claim 2, wherein said pinion is supported between two thrust bearing means.

References Cited

UNITED STATES PATENTS

| | | | |
|---|---|---|---|
| 2,018,697 | 10/1935 | Zwick | 90—13.1 |
| 2,646,725 | 7/1953 | Brynildsrud | 90—13.2 |
| 3,166,987 | 1/1965 | Ramsey | 90—13.1X |

GIL WEIDENFELD, Primary Examiner

U.S. Cl. X.R.

33—23R